Figure 1:
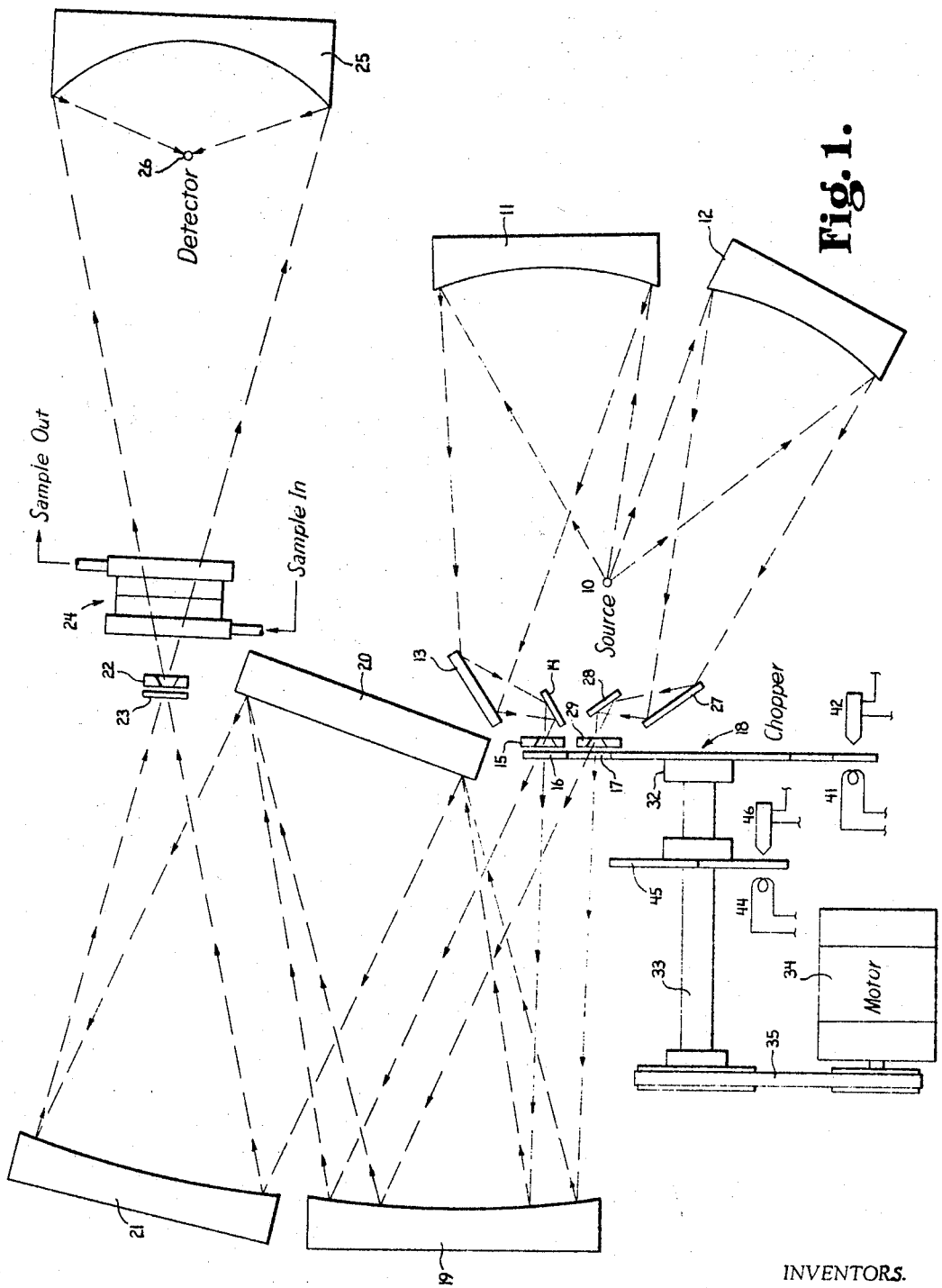

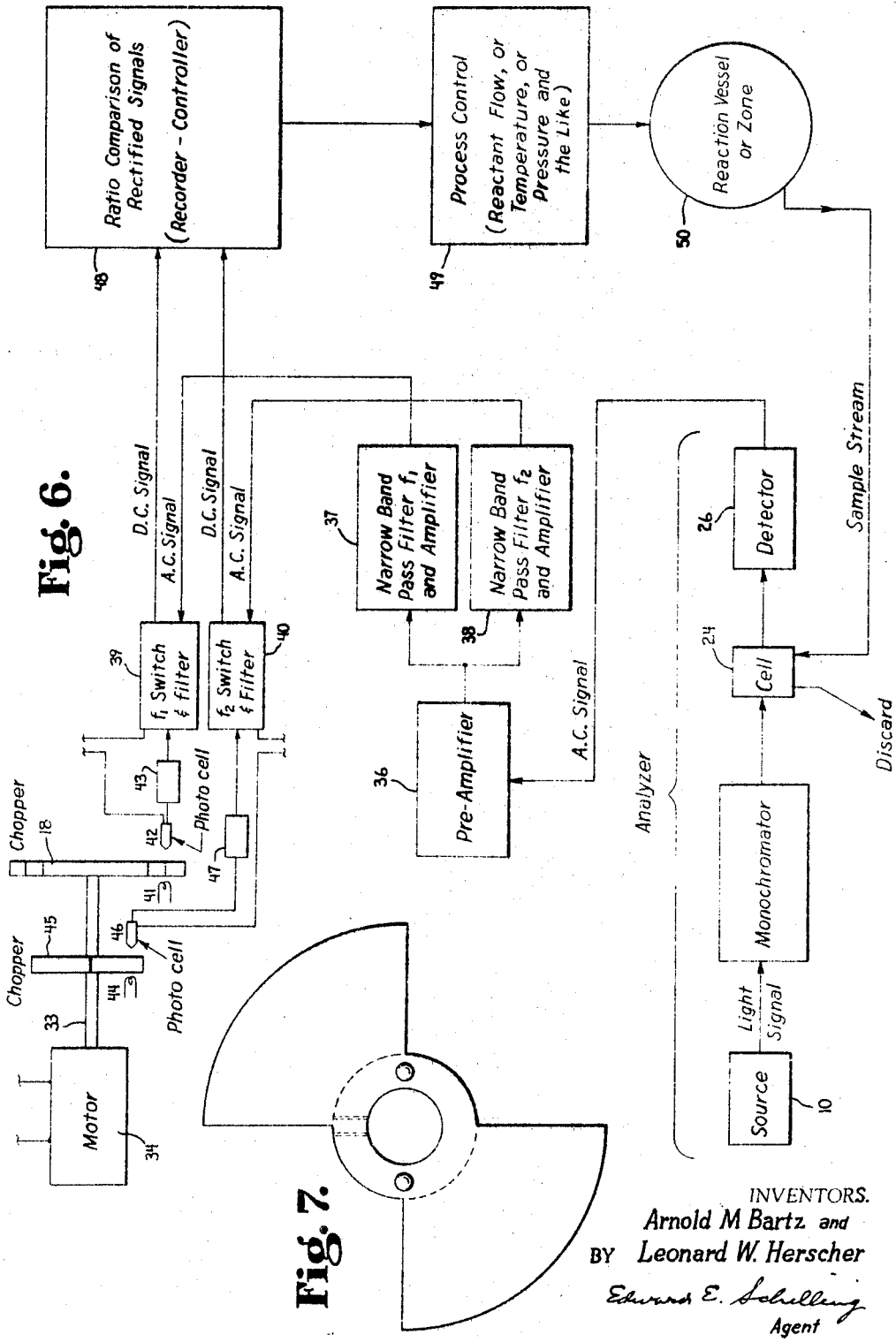

ically suitable for stream analysis of a mixture, the analysis involving the quantitative determination of the composition of the mixture by ascertaining the ratio of its absorptions of radiant energy at two selected wave lengths. This apparatus provides improved means for segregating and discriminating monochromatic beams of different wave lengths from radiation from a single source, the segregated monochromatic beams having been directed on a single detector.

3,279,308
DISPERSIVE ANALYZER HAVING MEANS FOR SEGREGATING DIFFERENT WAVELENGTHS OF RADIATION FROM A SINGLE SOURCE

Arnold M. Bartz and Leonard W. Herscher, Midland, Mich., assignors to The Dow Chemical Company, Midland, Mich., a corporation of Delaware
Filed Dec. 2, 1963, Ser. No. 327,242
8 Claims. (Cl. 88—14)

This invention relates to an improved apparatus for spectral analysis, photometry, and the like, of a mixture of radiation responsive substances and more particularly relates to absorption spectrometry apparatus which is especially suitable for stream analysis of a mixture, the analysis involving the quantitative determination of the composition of the mixture by ascertaining the ratio of its absorptions of radiant energy at two selected wave lengths. This apparatus provides improved means for segregating and discriminating monochromatic beams of different wave lengths from radiation from a single source, the segregated monochromatic beams having been directed on a single detector.

For the purposes of the specification and the appended claims, the term monochromatic radiation refers to a narrow band of consecutive wave lengths not more than 50 reciprocal centimeters wide.

Analyzers proposed heretofore for the purpose of sampling a single beam of radiation at two different wave lengths have had the disadvantage of exhibiting inherent limited response and accuracy. Earlier instruments have also been limited in usefulness by a relatively high, lowest level of concentration at which a given subsance may be quantitatively measured.

It is therefore a principal objective of the present invention to provide novel apparatus for special analysis, photometry, and the like, which overcomes the inherent difficulties and limitations in prior apparatus for sampling a single beam of radiation at two different wave lengths.

Another object of the present invention is to provide simpler, more reliable apparatus for sampling and measuring the intensity of a single beam of radiation at two different selected wave lengths.

Still another object of the present invention is to provide novel apparatus for spectral analysis, photometry and the like which avoids the use of the mechanical apparatus of the optcial null system.

These and other objects and advantages of the present invention are attained by a novel assembly of parts including, in combination, a single source, a single detector, a monochromator having dispersing means as a component part, means for concurrently directing radiation at the dispersing means from two different angles of incidence thereby passing two monochromatic bands through the monochromator, means for chopping radiation presented at each different angle of incidence at a respectively different frequency, and means for frequency discrimination and comparison of the concurrent signals produced by the detector in response to the radiation chopped at said differing frequencies. The component parts and the arrangement thereof are hereinafter more fully described.

For the purposes of the specification and claims, the term monochromator refers to a combination of parts, in the optical system of a spectrophotometer, which is adapted to select and pass, from a given light beam, only a substantially monochromatic band. Although the monochromator in the present apparatus passes light at two different wavelengths instead of the more usual single wavelength, it selects and passes only one monochromatic band from each of the two beams presented via alternate routes. Since the monochromator still acts as a monochromator toward each beam, it will be referred to hereinafter by the familiar term, monochromator.

The improved apparatus includes mirror and entrance slit means for selecting two beams of radiation from a single source and passing the two beams through a novel chopper which cylically interrupts each beam at a different frequency. At each revolution of the chopper, each beam is passed for as long an interval or intervals as is reasonably feasible, preferably for a total time equal to one-half of the time elapsed during a single revolution of the chopper.

The two intermittent beams are directed by mirror means upon a single radiation dispersing element. The dispersed radiation is reflected from a single collimating mirror along an optical path through a single exit slit. The radiation passing the single exit slit passes through a sample cell to a condensing mirror which focuses the radiation on the detector. The two cyclically interrupted beams fall on the detector, each at its own chopping frequency, so that the detector may be, and usually is, illuminated in part concurrently by both beams and in part alternately by at least one of the beams. The signals produced by the detector are selectively discriminated and compared in an electronic ratio comparison system. Such ratio comparison systems are well understood in the spectrometric and electronic arts.

Figure 2:
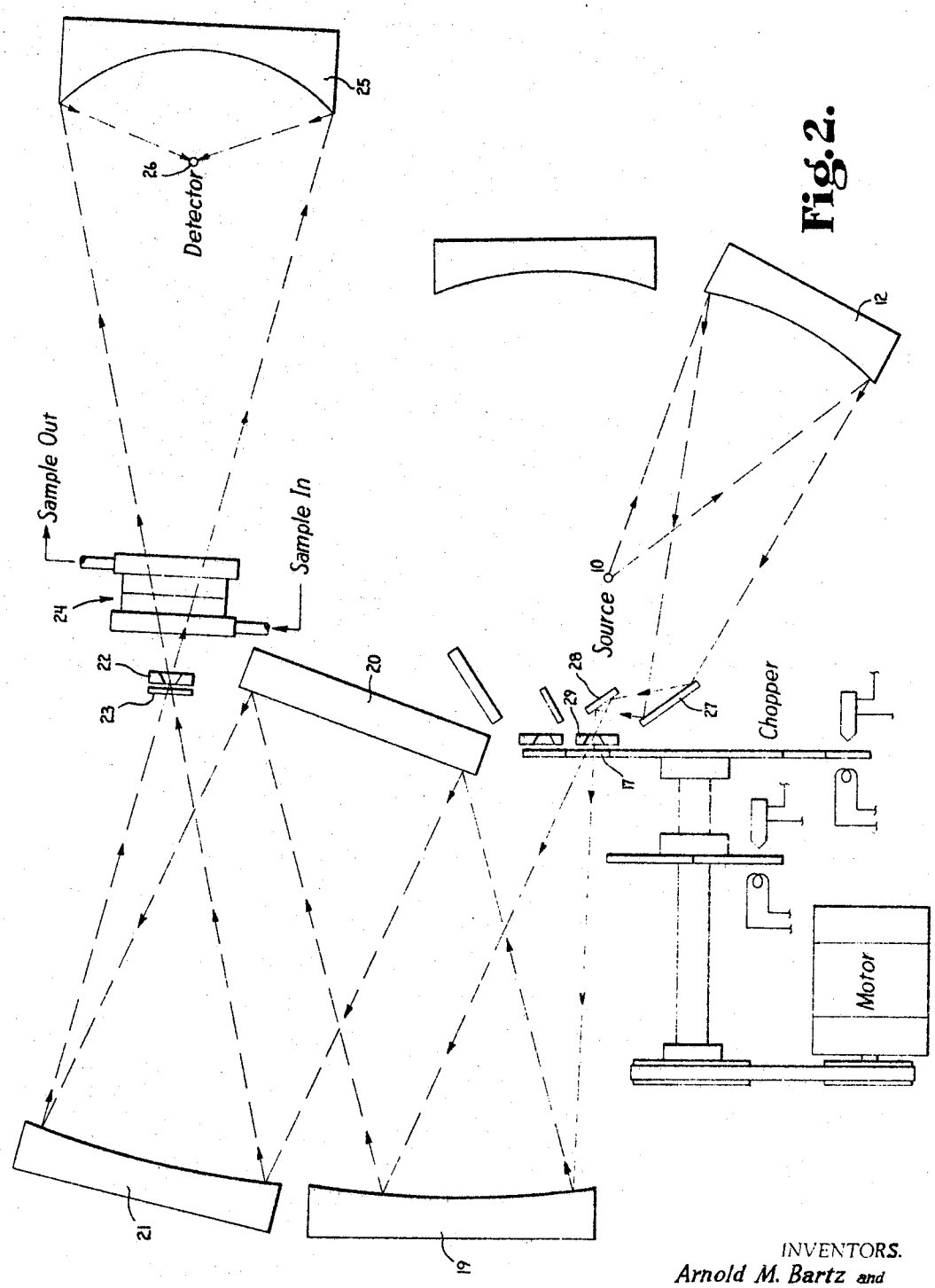
Figure 3:
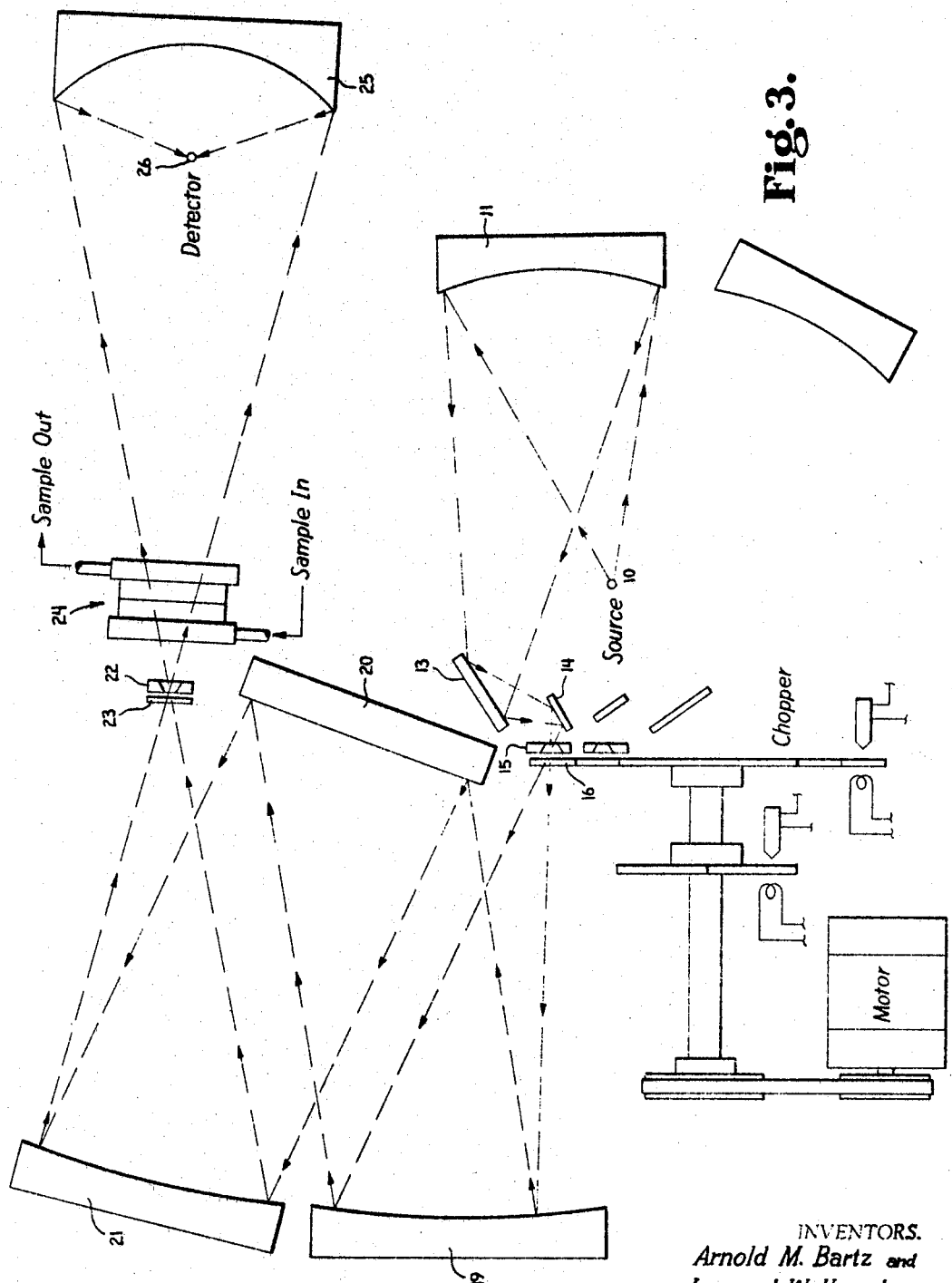
Figure 4:
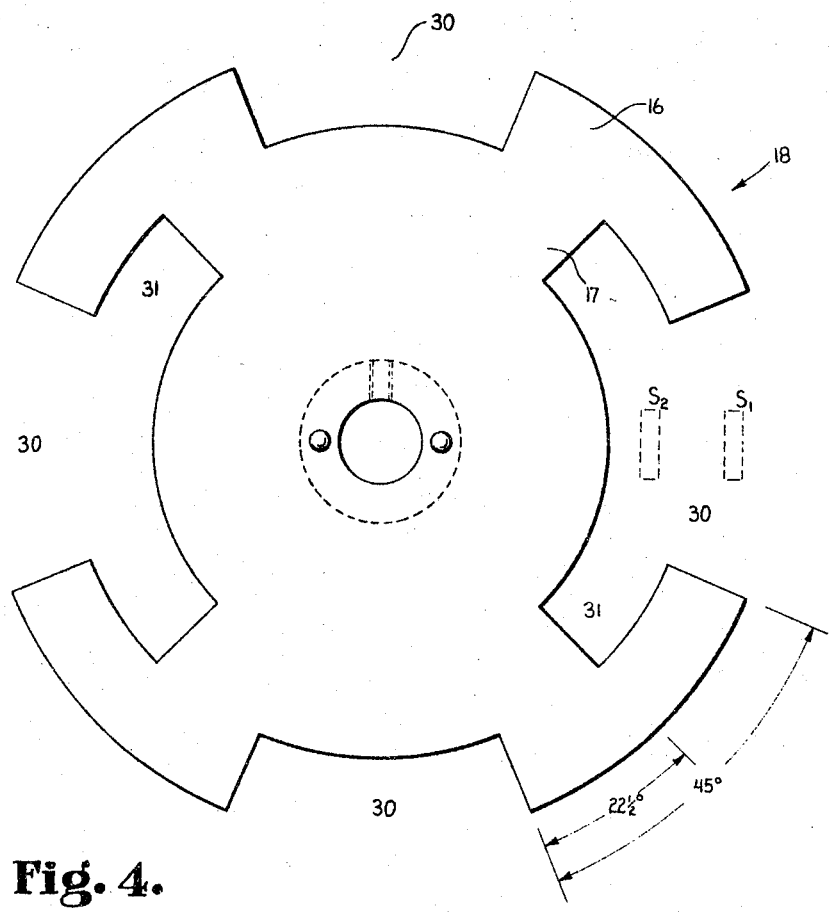
Figure 5:
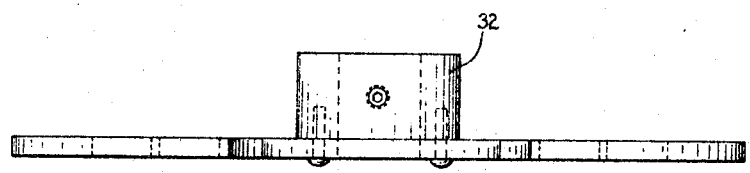

The advantages and features of the present invention will be better understood upon becoming familiar with the following description, reference being had to the appended drawings in which like numerals identify like parts, and in which, FIG. 1 is a diagrammatic plan view of one form of the apparatus showing the radiation source, the detector, a sample cell, and the optical path having dual segments, FIG. 2 is a diagrammatic plan view similar to FIG. 1 showing only one of the dual segments of the optical path followed from the source to the dispersing means, FIG. 3 is a similar diagrammatic plan view of the apparatus showing the optical path, including the other of the dual segments of the path between the source and the dispersing means, FIG. 4 is a front elevation of the novel chopper employed in the present invention, FIG. 5 is a top view of the said chopper, FIG. 6 is a schematic arrangement of parts showing the analyzer of the present invention, including a detector, and a system for utilizing the output of the detector, and FIG. 7 is a front elevation of a simple additional chopper used in the signal rectification system.

While an absorption spectrometer embodying the apparatus of the invention may be employed in different forms for examination of a sample by different kinds of radiation, the apparatus shown is adapted for, and will be particularly described with reference to, spectral analysis by means of infrared radiation.

The apparatus shown in FIG. 1 includes a source 10 emitting infrared radiation, including the two wave lengths to be used for analytical purposes. The source may be any of the kinds commonly used, e.g., nichrome wire, a nerst glower or a piece of silicon carbide heated by the passage of electric current therethrough. Radiation from the source 10 is sampled by the two mirrors 11 and 12 in order to send radiation along the dual segment portion of the optical path.

The first of the dual segments will be described with reference to both FIG. 1 and FIG. 3. Radiation sampled by mirror 11 starts the radiation along the first dual segment. The radiation reflected from spherical mirror 11 is reflected by mirror 13 onto mirror 14 which directs the radiation through entrance slit 15. Radiation passing the entrance slit 15 passes through an open sector in the outer annular portion 16 of the chopper 18 and is cyclically interrupted by the imperforate sections of the annular portion 16 of the chopper. The radiation passing the chopper falls upon the collimating mirror 19, an element common to both dual segments, and is directed from there to the dispersing means 20. The dispersing means usually is a diffraction grating, although a prism may be used. The dispersing means is preferably provided with means for adjusting the angle of incidence of radiation falling thereon. It is at the dispersing means that the beams following the dual segments become substantially coincident and then follow a common path to the detector.

Radiation from the dispersing means 20 is directed at an appropriate angle at a collimating mirror 21, which directs part of the dispersed radiation toward the exit slit 22. The collimating mirror 21 is positioned so as to collect only a part of the dispersed radiation. The part collected contains the radiation of the analytical wave length in each beam falling on the mirror. Radiation not collected by the collimating mirror 21 goes no further along the optical path. A further selection of the dispersed radiation occurs when the radiation reaches the exit slit 22. There the very narrow opening in the exit slit permits passage of only the very narrow band width of radiation from each beam which constitutes the analytical wave length radiation desired.

Generally it is highly desirable to insert a radiation filter 23 in the optical path, conveniently just in front of the exit slit 22 for the purpose of stopping other unwanted radiation, e.g., radiation of a higher order. Such a radiation filter, which may be, typically, of silver chloride coated with silver sulfide, is needed, for example, in infrared work to stop shorter wavelength radiation. The coated silver chloride filter described stops near infrared, visible, and ultraviolet radiation, portions of which would not be rejected from the optical path by the combined action of dispersing element 20, the collimating mirror 21 and the exit slit 22.

Radiation passing the exit slit 22, traverses the sample cell, indicated generally by the numeral 24, falls on the ellipsoidal mirror 25 and is focused thereby on the detector 26. The detector 26 may be a pin thermocouple, a lead sulfide cell, or a bolometer, or the like, as is well understood in the art.

The collimating mirrors 19 and 21 may be either spherical or parabolic mirrors, as desired. However, spherical mirrors are to be preferred in a practical system since they are less expensive, and being used in pairs in this apparatus, tend to compensate out spherical aberrations, making the use of parabolic reflectors unnecessary.

For the purposes of the present description, with reference to infrared analysis, it will be understood that all mirrors are metallized on the surface facing incident radiation.

The other segment of the dual segment portion of the optical path will be more fully understood with reference to both FIG. 1 and FIG. 2.

The radiation reflected from mirror 12 is further reflected from plane mirror 27 and is thence directed to plane mirror 28. The radiation leaving plane mirror 28 passes through entrance slit 29, passes through the open sectors in annular portion 17 of the chopper 18 and falls on the collimating mirror 19 and is directed to the dispersing means 20. The dispersing means 20 is the common junction of the dual segment portions of the optical path and the radiation passing through the entrance slit 29, to the collimating mirror 19 and falling on the dispersing means 20 thereafter follows the same optical path as the radiation passing entrance slit 15.

The operation of the present novel chopper 18 will be more fully understood with reference to FIGS. 4 and 5 as well as FIG. 1.

As shown in FIGS. 4 and 5, the chopper consists of a generally discate plate having an outer annular peripheral portion 16 provided with a selected number of evenly spaced open sectors or cut out portions 30 of substantially equal dimensions, that is, having the same length of arc and the same radial width. The chopper is further provided with a selected number of evenly spaced open sectors 31 of substantially equal dimensions located or formed in an inner annular portion 17 inwardly adjacent and usually contiguous to the outer annular portion 16.

The number of open sectors 30 in the outer annular portion is essentially different than the number of open sectors 31 in the annular portion so that beams will be passed at differing frequencies. While the chopper as shown has four openings in the outer annular portion and two openings in the inner annular portion, the illustration is not to be considered limiting. Any practical number of openings may be provided in either annular portion so long as: (1) the number of openings in each annular portion is different, (2) the resulting chopper is structurally feasible and (3) 100 percent modulation is achieved. Preferably the greater number of openings is in the outer annular portion in order that similar wave forms arise from each chopped beam. If desired, the number of openings provided in each annular portion may be such that the ratio of the numbers of openings is not a simple fraction having one as the numerator, thus avoiding the situation in which one frequency has a simple harmonic relation to the other. A desirable combination of numbers of openings is had with 2 openings in the inner annular portion and 5 openings in the outer.

The relationship of the beams of radiation, passing the entrance slits 15, 29, to the sector openings 30, 31, in the chopper 18 is illustrated in FIG. 4. The image of slit 15, here indicated as $S_1$, should fall within openings 30, while the image of slit 29, here identified as $S_2$, should fall within openings 31, as the chopper is rotated.

As shown in FIGS. 4 and 5 the discate portion of the chopper is provided with means 32 for mounting the chopper on a rotating shaft. Referring again to FIG. 1, the chopper 18 is shown mounted on a shaft 33. The shaft is driven by means of an electrical motor 34, the motor 34 being connected to the shaft by a belt drive 35. It will be understood that any suitable means for driving the shaft 33 may be employed, e.g., a chain or gear drive connection between the motor 34 and the shaft 33. Or, if desired, the chopper may be on the same shaft as the motor. Generally, the chopper is rotated at the requisite rotational speed to interrupt the dual segments of the beam at a frequency commensurate with the response time of the detector employed.

The sample cell 24 may be any suitable device for holding a gas or liquid, i.e., a fluid, solution sample which is to be subjected to spectral analysis. Since the apparatus is primarily designed for stream analysis work, the cell will usually be provided with an inlet and an outlet so that a stream may flow through the cell. The cell is necessarily provided with windows that will transmit radiation of the type wavelength region used for the analysis. For example, sodium chloride, silver chloride or calcium fluoride windows are frequently used in infrared work. The cell also must present a sufficient unrestricted opening to the optical path so as not to constrict or diffract the beam of radiation passing therethrough.

The sample cell may be positioned, if desired, along the optical path at other locations than the one specifically illustrated in the drawing. Thus, if the sample cell construction and size permit, the cell may be located at any place where both beams follow a common path and are sufficiently focused or condensed to pass through cell windows and apertures of reasonable size as employed in the art. One possible position is adjacent the source 10 with the cell positioned so as to transmit radiation to both of the spherical mirrors 11 and 12. However, the position shown in the drawing is generally to be preferred and especially in analyzing liquid samples, as liquid samples are heated less by monochromatic radiations than by an undispersed beam, and there is less tendency either for the solvent to boil or for density changes to take place in the sample.

The utilization of the signal arising at the detector 26 is more fully understood with reference to FIG. 6.

The consequences of chopped radiation falling concurrently on the detector according to the present invention are a signal consisting of partly concurrent, partly overlapping and partly discrete alternating current type signals which are superimposed, but of two differing frequencies. The composite signal produced by such superimposition is first fed to a preamplifier 36, a first stage amplifier usually placed very close to the detector 26. After this initial amplification, the superimposed signals are fed to parallel amplifier units 37, 38, each containing, respectively, a narrow frequency electrical band pass filter which will pass one of the superimposed signals but not the other. Thus, for example, the electrical band pass filter $f_1$ in the apparatus as shown might pass the higher frequency signal arising from the high frequency of chopping, while the filter $f_2$ would then be one selected to pass the lower frequency signal. In each amplifier, the incoming signal is first directed to the narrow band pass filter. The signal passing the band pass filter is amplified through several stages of amplification before the respective signals are directed to respective rectification elements 39, 40, each containing a switch followed by an electrical filter. As shown, the signal from amplifier 37 is directed to rectification element 39, while the signal from the amplifier 38 is directed to the rectification element 40.

Synchronous rectification takes place within the conventional rectification elements 39, 40, which are designed to effect full wave rectification. In each rectification element 39, 40, a quick-acting switch converts the alternating current-type signal into a series of halfwaves. These signals are then filtered to remove the remaining "ripple."

Synchronization may be carried out in any suitable manner, e.g., the switches passing the amplifier output may be controlled by a relay circuit which is energized by means of switches actuated by cams associated with the chopping means on the shaft on which the chopper is mounted. The cam actuated switches must be arranged, respectively, to each rectify one signal. One switch would thus operate at the $f_1$ frequency to carry the signal of $f_1$ frequency and the other switch at the $f_2$ frequency to carry the signal of $f_2$ frequency.

A preferred manner of accomplishing synchronous switching is to control each quick-acting switch by means of a relay circuit, the current impulses in which arise from a photodiode. Each photodiode is positioned on the opposite side of a chopper from a light source such as a small tungsten lamp and becomes conductive of impressed current only when illuminated. The relatively weak impulses passed by the photodiode are magnified by a Schmitt trigger, sometimes known as a "flip-flop" switch. These magnified impulses are then used to actuate the quick-acting switch which, as indicated above, reverses polarity at the appropriate frequency to pass and the signal of the desired frequency. Each switch, being a synchronous rectifier driven at the precise signal frequency, discriminates against signals of all other frequencies, since the direct current value of the parts of signals of other frequencies passing the switch would tend to average zero.

As shown in FIG. 6, tungsten lamp 41 is located on the opposite side of chopper 18 from photodiode 42. The lamp 41 illuminates the photodiode 42 each time on open sector in annular portion 16 of the chopper passes the photodiode. Impulses transmitted by the photodiode 42 are magnified by the Schmitt trigger 47 and fed to the switch in rectification element 40. The second chopper 45 is provided with open sectors of the same degrees of arc as the sectors in the annular portion 17 of the chopper 18. A suitable design for a second chopper 45 is illustrated in FIG. 7 of the drawings. The two choppers 18, 45 are preferably mounted on the same shaft and are precisely aligned so that the impulses of the photodiode 46 cause the switch in rectification element 40 to operate in phase with the signal arriving from the other amplifier unit 38.

Any other suitable means for cyclically illuminating the photodiodes 42, 46 may be used if desired. Thus, both lamp and photodiode combinations may be disposed in association with the regular chopper 18, or, two separate choppers similar to chopper 45 may be disposed on the shaft 33 or any shaft driven synchronously with shaft 33. Each separate chopper may be designed to intermittently and regularly pass light from a tungsten lamp or other suitable light source to the corresponding photodiode at the respective required frequency.

The direct current signals, each at its own magnitude, are separately directed from the switching and filtering elements 39, 40 to a conventional ratio comparison unit 48. Here the two signals are compared and balanced electrically in a potentiometer circuit having a movable slidewire contact, and the movement of the slidewire contact by means of a servo system in order to effect a balance is recorded by a pen recorder and/or used to operate a process controller unit 49, e.g., a unit such as a valve controlling flow of reactants to the reaction vessel or zone 50, or a variable resistance element controlling reactor temperatures.

In operating the combination of units or parts shown in FIG. 6 as a "closed loop," the mixture in the reaction zone, or the reaction product, is sampled and the sample is sent as a small stream to the sample cell 24 in the analyzer section. The nature of the infrared radiation transmitted varies with the stream composition. Thus, the optical signals reaching the detector vary. The output of the detector is transmitted via the system described to the process cnotroller 50 which varies process conditions and product composition, thus completing the loop.

In using the present instrument for a given analysis, the instrument is adjusted so as to select substantially monochromatic radiation at the two analytical wave lengths employed. Each wave length adjustment is made by changing the position of the appropriate entrance slit, as well as the positions of the dispersing means and the plane mirrors which direct radiation through the entrance slits, as required, thereby changing the angle of incidence at which the passed beam falls on the dispersing means. As a consequence of this change, a different selected portion of the spectrum of the beam passing each entrance slit illuminates the exit slit and is passed to the detector. Ordinarily, the entrance slit in one part of the dual segments of the optical path is adjusted so as to select radiation at a reference wave length, e.g., at a suitable measuring wave length in an absorption of an interfering absorber, while the other entrance slit is adjusted so as to select radiation at a suitable measuring wave length in an absorption peak which consists of the concurrent absorption by the substance to be measured and a second absorption due to the interfering absorber, as understood in the art.

As an example of the use of the instrument of the invention for the determination of ortho-ethyl toluene in a liquid sample stream containing meta-ethyl toluene, the entrance slit in one path is set to select monochromatic radiation at a wave length of 13.22 microns, which is the location of both ortho-ethyl toluene and meta-ethyl toluene absorptions. The entrance slit in the other path is adjusted to select monochromatic radiation at a wave length of 14.09 microns which is the location of a meta-ethyl toluene absorption of very nearly the same intensity as the meta-ethyl toluene absorption at 13.22 microns. The so-adjusted instrument, when employed with a liquid cell having an optical path of about 0.1 millimeter, readily exhibits a span of 0 to 5% ortho-ethyl toluene full scale on the recorder with less than 0.5 percent noise, using presently available components.

Among the advantages of the apparatus of the present invention is the very good reproducibility of analytical results which is made possible by the present system in which the mechanical operation of a comb attenuator is eliminated.

It will be understood that while the instrument in the form shown is intended for use in the infrared field and the collimating and focusing elements are mirrors and the dispersing means or element is preferably a diffraction grating, the instrument may be readily employed with visible and ultraviolet radiation. For use in visible field, the collimating, focusing and dispersing elements may be front surface mirrors or glass lenses. For use in the ultraviolet field, the collimating, focusing and dispersing elements may be front surface mirrors or quartz lenses. The detector and the source used will depend on the kind of radiation employed, as is well understood in the art.

The apparatus of the invention having been thus fully described, obvious modifications thereof will be apparent to those skilled in the art, and the scope of the invention is to be considered limited only by the appended claims.

We claim:
1. In an improved apparatus for segregating, from radiation from a single source, monochromatic beams differing in wave length:
   means for concurrently directing radiations from a single source upon a single dispersing means at two different angles of incidence;
   means for chopping, at respectively different frequencies, the radiation directed at the two different angles of incidence;
   and the radiations directed at the two different angles of incidence traversing two respectively different paths to the single dispersing means.

2. The apparatus as in claim 1 in which the chopping means comprises a plural sector rotating chopper, said chopper having a first annular peripheral portion provided with a selected number of evenly spaced open sectors of substantially equal dimensions and a second annular portion inwardly adjacent to said first annular portion, said second annular portion being provided with a selected number of evenly spaced open sectors of substantially equal dimensions, the number of open sectors in the first annular portion being different than the number of open sectors in the second annular portion, and said rotating chopper being provided with means for rotating the said chopper at a substantially constant preselected rotational speed.

3. An improved apparatus for segregating, from radiation from a single source, monochromatic beams differing in wave length which comprises in combination:
   a single source, a single detector, a monochromator having dispersing means as a component part, means for selecting, from radiation leaving the dispersing means, monochromatic beams of two different wave lengths, means for concurrently directing radiation from the source upon the dispersing means at two different angles of incidence, means for chopping radiation presented at each different angle of incidence at respectively different frequencies and means for frequency phase discrimination and comparison of concurrent signals produced by the detector in response to the radiations chopped at said differing frequencies.

4. The improved apparatus as in claim 3 in which the dispersing means is a diffraction grating.

5. The improved apparatus as in claim 3 in which the means for selecting monochromatic beams of radiation leaving the dispersing means includes an exit slit.

6. The apparatus as in claim 3 in which the chopping means comprises a plural sector rotating chopper with means for rotating the said chopper at a substantially constant preselected rotational speed.

7. The improved apparatus as in claim 3 which includes, in addition, a single sample cell positioned so that all of the radiation reaching the single detector from the single source traverse the single sample cell.

8. Improved apparatus suitable for use in absorption spectrometry which comprises:
   a radiation source;
   a detector producing a signal in response to radiation falling thereon;
   means, including dispersing means and an exit slit, defining a path for said radiation from said source to said detector, said path having first and second alternate segments, both said segments passing a plural sector rotating chopper having a first annular peripheral portion provided with a selected number of evenly spaced open sectors of substantially equal dimensions and a second annular portion provided with a selected number of evenly spaced open sectors of substantially squal dimensions, the number of open sectors in the first annular portion being different than the number of open sectors in the second annular portion;
   said first alternate segment of the path extending through the open sectors of said first annular portion of said chopper and being defined by first and second plane mirrors and a first entrance slit, said first and second plane mirrors being disposed so as to direct said radiation to a collimating mirror which is a common element in defining both segments of the path, said second alternate segment of the path extending through the open sectors of said second annular portion of said chopper and being defined by third and fourth plane mirrors and a second entrance slit, said third and fourth plane mirrors being disposed so as to direct said radiation to said collimating mirror, and said first alternate segment of said path being adapted to bring radiation to said dispersing means via said collimating mirror at a different angle of incidence than radiation traversing said second alternate segment.

References Cited by the Examiner
UNITED STATES PATENTS

| | | | |
|---|---|---|---|
| 2,680,989 | 6/1954 | Savitzky, etc. | 250—43.5 |
| 2,843,008 | 7/1958 | Moutet | 250—43.5 |

RALPH G. NILSON, *Primary Examiner.*

A. L. BIRCH, *Assistant Examiner.*